(12) United States Patent
Ervin

(10) Patent No.: US 7,461,864 B2
(45) Date of Patent: Dec. 9, 2008

(54) RECREATIONAL MOTOR VEHICLE

(76) Inventor: David Ervin, 1490 N. Enochville Ave., China Grove, NC (US) 28023

( * ) Notice: Subject to any disclaimer, the term of this patent is extended or adjusted under 35 U.S.C. 154(b) by 431 days.

(21) Appl. No.: 11/154,235

(22) Filed: Jun. 16, 2005

(65) Prior Publication Data
US 2005/0280254 A1 Dec. 22, 2005

Related U.S. Application Data

(60) Provisional application No. 60/580,304, filed on Jun. 16, 2004.

(51) Int. Cl.
*B62D 21/12* (2006.01)
*B60K 1/00* (2006.01)
(52) U.S. Cl. .................. 280/781; 180/65.2; 180/298
(58) Field of Classification Search .................. 280/781
See application file for complete search history.

(56) References Cited

U.S. PATENT DOCUMENTS

| | | | | | |
|---|---|---|---|---|---|
| 2,079,218 | A | * | 5/1937 | Ledwinka | 180/62 |
| 2,319,002 | A | * | 5/1943 | Kramer | 454/141 |
| 4,217,970 | A | * | 8/1980 | Chika | 180/298 |
| 4,267,895 | A | | 5/1981 | Eggert, Jr. | |
| 4,682,668 | A | * | 7/1987 | Salmon et al. | 180/209 |
| 4,842,326 | A | | 6/1989 | DiVito | |
| 5,740,878 | A | | 4/1998 | Sala | |
| 5,908,077 | A | * | 6/1999 | Moore | 180/65.2 |
| 5,934,397 | A | * | 8/1999 | Schaper | 180/65.2 |
| 5,961,135 | A | | 10/1999 | Smock | |
| 6,142,253 | A | | 11/2000 | Mueller et al. | |
| 6,170,596 | B1 | | 1/2001 | Triarsi et al. | |
| 6,276,477 | B1 | * | 8/2001 | Ida | 180/89.1 |
| 6,631,925 | B1 | | 10/2003 | Lawson, Jr. | |
| 7,096,986 | B2 | * | 8/2006 | Borroni-Bird et al. | 180/68.1 |

* cited by examiner

*Primary Examiner*—Christopher Ellis
*Assistant Examiner*—Bridget Avery
(74) *Attorney, Agent, or Firm*—Kilpatrick Stockton LLP

(57) ABSTRACT

A recreational motor vehicle capable of accommodating a driver of varying sizes. Embodiments can also be modified for use on circular or in-line tracks or multiple racing formats. The external appearance of the vehicle may be readily modified through the switching of a exterior body which is supported on a rigid frame that completely encloses and protects the driver. Further safety features may be provided such as; a firewall between the engine and seat, fire suppression system, and escape hatch.

20 Claims, 8 Drawing Sheets

Top View

DRIVERS SIDE

BOTTOM VIEW

TOP VIEW

SIDE VIEW

BOTTOM VIEW

RECREATIONAL MOTOR VEHICLE

CROSS REFERENCE TO RELATED APPLICATIONS

The present application claims priority under 35 U.S.C. § 119(e) from U.S. Provisional Patent Application Ser. No. 60/580,304, filed Jun. 16, 2004, entitled "Recreational Motor Vehicle," the disclosure of which is incorporated herein by reference.

FIELD OF THE INVENTION

The present invention relates to a recreational motor vehicle. More particularly, the present invention relates to a recreational motor vehicle designed which is adjustable to a particular driver or race situation.

BACKGROUND OF THE INVENTION

Four-wheeled recreational motor vehicles of reduced size for street or track use include go-carts and dragsters. Go-carts may have a seat that is fixed to the frame between the axles. The engine, which is generally a gasoline-powered, single-cylinder engine, may be located behind the seat and before the rear axle. The accelerator and foot brake pedals may be disposed close to the front axle and may be a fixed distance from the seat or adjustable distance from the seat.

Generally, conventional go-carts generally come in "child" and "adult" sizes. These go-carts have features which are unique to the initial size determination. Aspects that would need to be variable for different sized drivers include, accelerator and break pedals, seat height, and seatbelt design.

In professional racing, severe injuries and deaths occurred when drivers still in their seats were thrown from cars. To counter this, the National Association of Stock Car Racing (NASCAR®) rules now require that the seat be attached, at several points, directly to the tubular structure that forms the roll cage, which is sometimes the only part of the car left intact after a crash. However, often the advantages of such features are typically overlooked in miniaturized racing vehicles such as go-carts or mini-dragsters. In the event of a crash in these vehicles, there remains the risk of serious injury to a driver and often the simple plastic or rubber seat is not enough to provide the requisite degree of safety many drivers desire.

Some recreational vehicles may be in the shape of a dragster. Full sized dragsters generally have large engines, such as a V8 engine, and are capable of speeds up to 150 miles per hour. These vehicles are prohibitively expensive for the hobbyist and are too large and too powerful for adolescents and young adults. Current mini-dragsters available for adolescents are typically made on a scale such that children older than 12 or 13 may not fit into the seat of the mini-dragster. In other words, a conventional mini-dragster does not allow for a range of persons ranging in size from an adolescent to an average sized adult to fit in or drive it. The mini-dragsters currently available also may not have the capability of switching the body shell or exterior appearance of the vehicle. In addition, the mini-dragsters currently available may be limited to in-line racing formats and may not have the capability of being modified for use for racing on a circular track.

Further, go-carts currently available that are able to change multiple exterior shells or designs may not contain roll cages and protective seating to protect the driver in case of a rollover. Often a go-cart will have a single "roll-bar" or other such device behind the driver's head to provide some protection in the event of a roll-over. However, protection in the front and sides of the driver is lacking in the prior art designs. It would, therefore, be desirable to have a mini-dragster style vehicle with the safety features more commonly seen in professional race circuits.

SUMMARY OF THE INVENTION

Embodiments of the present invention provide a recreational motor vehicle. Certain embodiments are capable of accommodating a driver of varying sizes. Embodiments can also be modified for use on circular or in-line tracks or multiple racing formats. For example, changing the two front tires and steering wheel in one embodiment can allow an individual to use the same car in an in-line racing format and a round track racing formation.

The external appearance of embodiments may also be readily modified through the switching of a shell, which is supported on the frame of the embodiment. Certain embodiments may also be less expensive to construct and assemble than commercially available mini-dragster vehicles. Embodiments may provide greater protection to the driver in the event of a rollover as compared to other miniaturized vehicles without a roll cage.

It is an object of one embodiment of the present invention to provide a recreational vehicle with a removable shell and thereby capable of easily changing body styles.

It is another object of one embodiment of the present invention to provide a recreational vehicle capable of accommodating persons of sizes from adolescents to adults.

It is another object of one embodiment of the present invention to provide a recreational vehicle capable of racing in in-line and round track formats.

It is another object of one embodiment of the present invention to provide a recreational vehicle capable of being assembled from a kit and at competitive cost, or for less than the cost to prepare a mini-dragster.

It is another object of one embodiment of the present invention to provide a recreational vehicle operable to provide protection to the driver in the event of a rollover.

As will be realized by those of skill in the art, many different embodiments of a recreational motorized vehicle according to the present invention are possible. Additional uses, objects, advantages, and novel features of the invention are set forth in the detailed description that follows and will become more apparent to those skilled in the art upon examination of the following or by practice of the invention.

Thus, there has been outlined, rather broadly, the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description or illustrated in the drawings. The invention is capable of other embodiments and of being practiced and carried out in various ways.

It is also to be understood that the phraseology and terminology herein are for the purposes of description and should not be regarded as limiting in any respect. Those skilled in the art will appreciate the concepts upon which this disclosure is based and that it may readily be utilized as the basis for designating other structures, methods and systems for carrying out the several purposes of this development. It is important that the claims be regarded as including such equivalent constructions insofar as they do not depart from the spirit and scope of the present invention.

So that the manner in which the above-recited features, advantages and objects of the invention, as well as others which will become more apparent, are obtained and can be understood in detail, a more particular description of the invention briefly summarized above may be had by reference to the embodiment thereof which is illustrated in the appended drawings, which drawings form a part of the specification and wherein like characters of reference designate like parts throughout the several views. It is to be noted, however, that the appended drawings illustrate only some and alternative embodiments of the invention and are, therefore, not to be considered limiting of its scope, as the invention may admit to additional equally effective embodiments.

DETAILED DESCRIPTION

Figure 1:
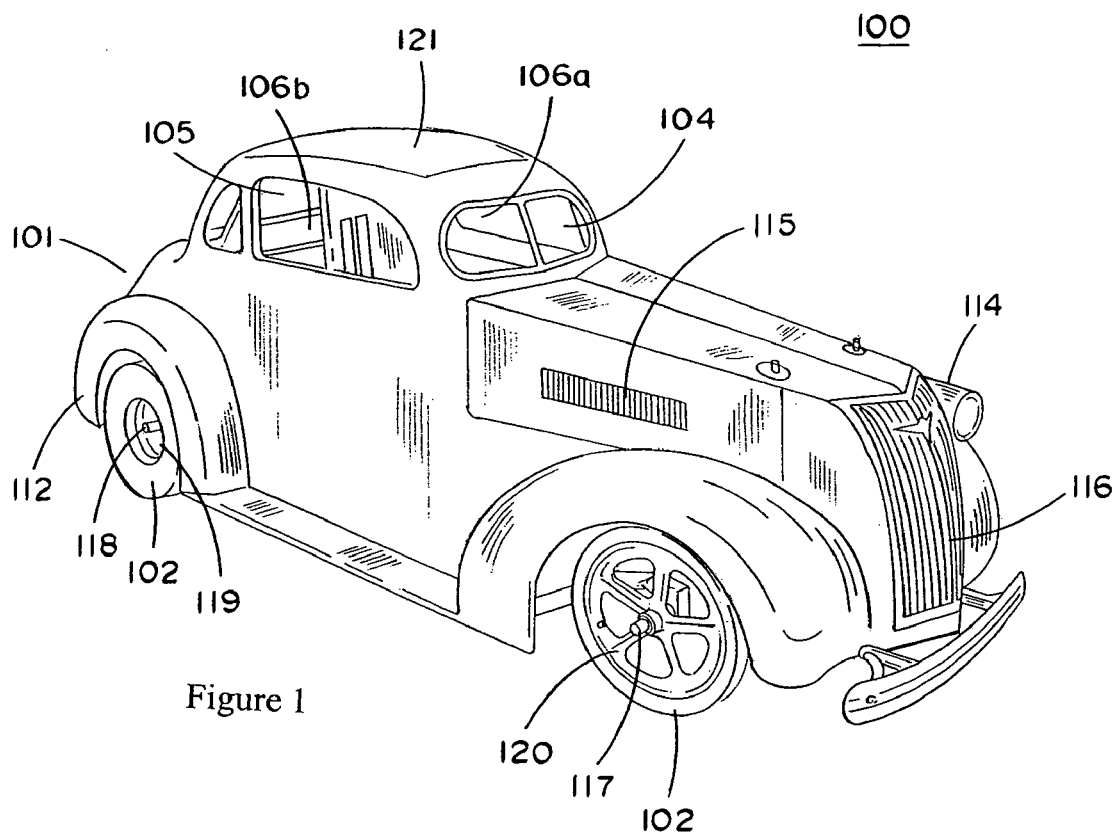
FIG. 1 is an illustration of an embodiment of a recreational vehicle of the present invention.

Referring now to the figures, in one embodiment of the present invention, a recreational vehicle 100 comprises several safety features incorporated into a mini-dragster type vehicle. These safety features comprise a frame 300 and roll cage which fully encloses and protects the driver, and a highly engineered safety seat 113 which may be designed around a National Association of Stock Car Racing (NASCAR®) approved safety seat. Other primary considerations of designing the recreational vehicle may include, but are not limited to, the wheelbase, lengths of a plurality of the axles 117, 118, and the shape of the exterior body 101. Additional components of the recreational vehicle 100 include, but are not limited to, an outer body 101, a steering assembly 108, a roof escape hatch 121, a plurality of wheels 119a, 119b, 120b, 120a, a plurality of tires 102a, 102b, 103a, 103b, a steering wheel 107, a plurality of control pedals (not shown), an engine 109, and a firewall 110. In one embodiment of the present invention, the material for construction of the frame as shown is a combination of 1.25 inch outer diameter steel tubing with 0.065 inch wall thickness, and 1 inch by 2 inch rectangular steel tubing welded with wire welding.

Figure 3A:
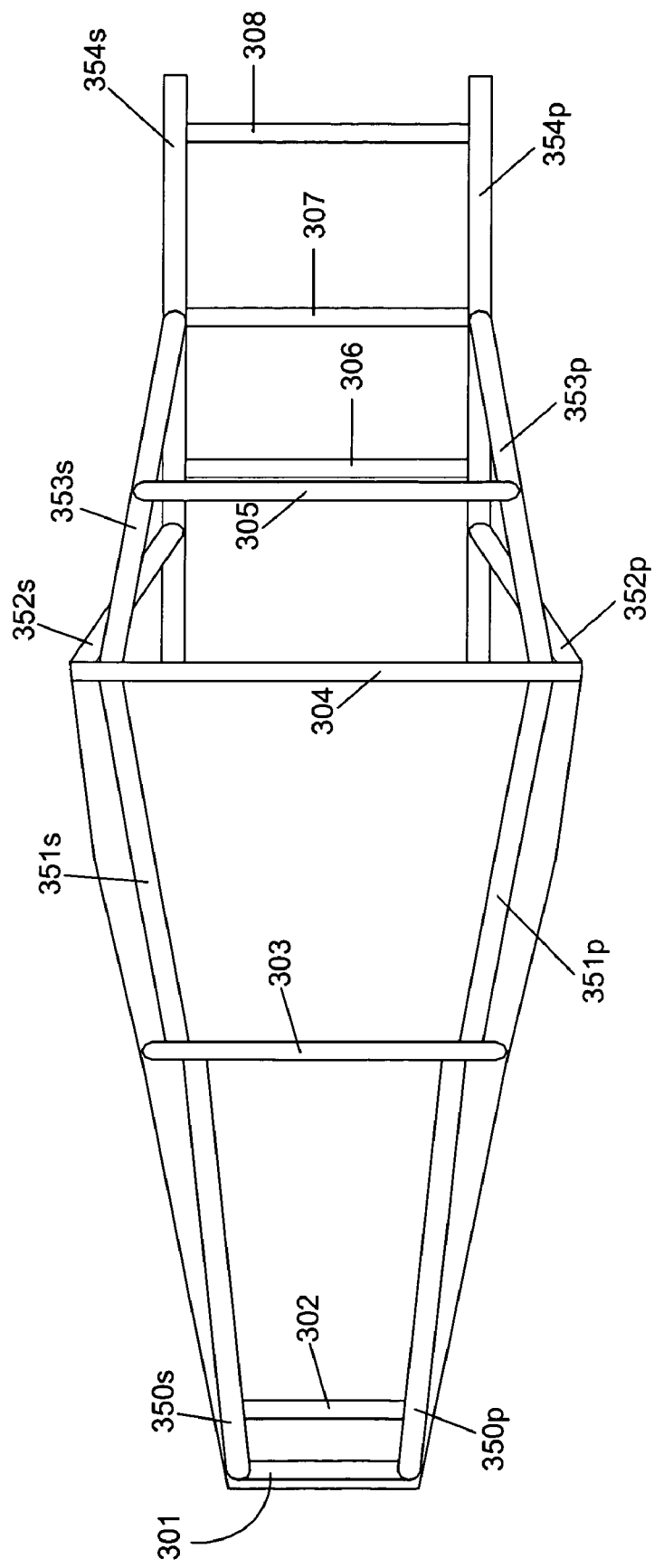
FIG. 3A is a top view of an embodiment of the chassis of the recreational vehicle of the present invention.
Figure 3B:
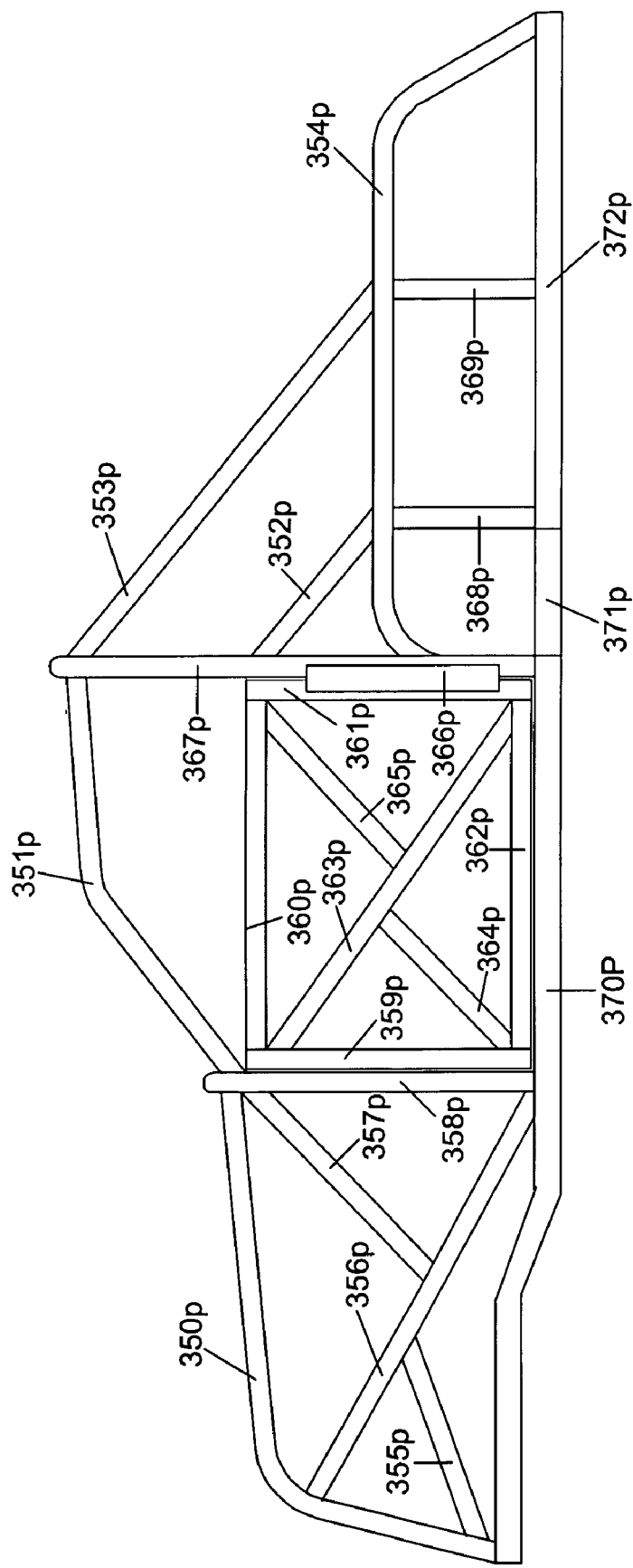
FIG. 3B is a driver's side view of an embodiment of the chassis of the recreational vehicle of the present invention.
Figure 3C:
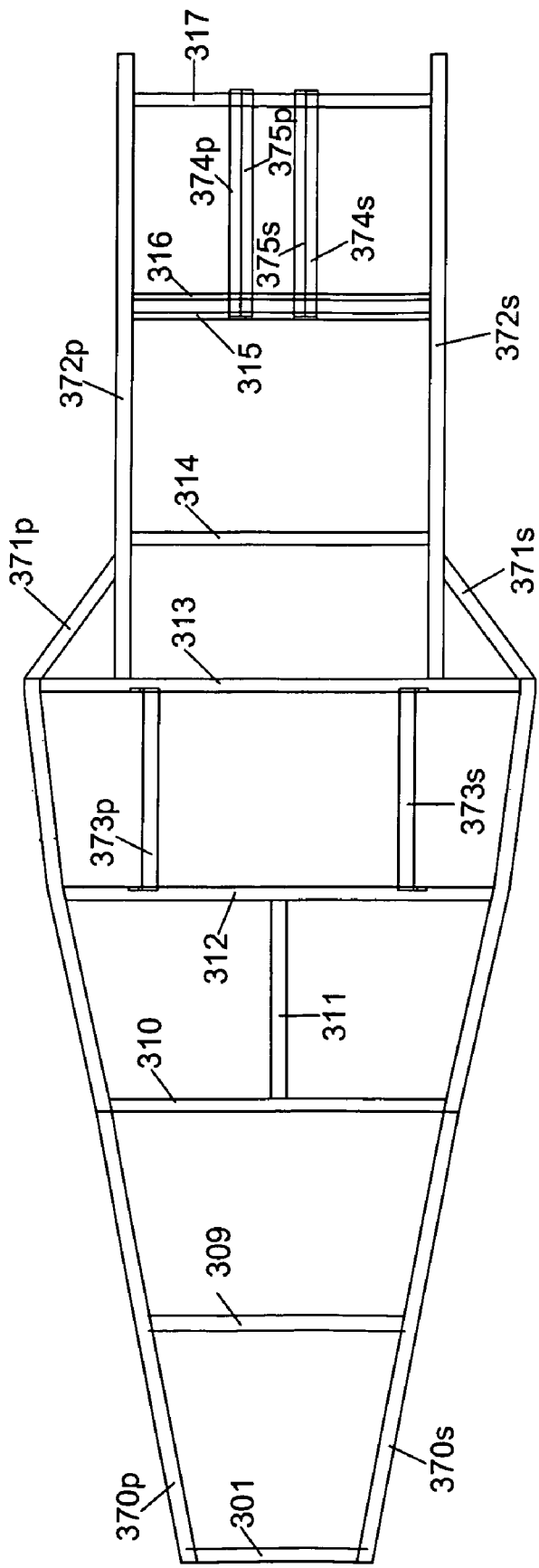
FIG. 3C is a bottom view of an embodiment of the chassis of the recreational vehicle of the present invention.

Referring now to FIGS. 3A, 3B and 3C, in an embodiment of the present invention, the chassis frame 300 comprises a cage comprising structural elements defining a driver cavity and an engine cavity 3300. The driver cavity comprises structural elements defining a driver torso cavity 3200 and a driver leg cavity 3100. The frame is constructed so as to completely enclose the driver and provide protection in the event of a collision or roll-over. Structural elements defining the driver cavity include overhead elements 303 and 304 which provide front and rear overhead protection, as well as overhead elements 351a and 351b, which provide lateral overhead protection. In a further embodiment of the present invention, the driver torso cavity 3200 and the driver leg cavity 3100 may be combined into one continuous space surrounded by structural elements. Additionally, other cavities may be formed within the space defined by the chassis 300.

The structural elements defining the base of the chassis frame may be elements such as 301, 309, 310, 311, 312, 313, 314, 315, 316, 317, 370a, 370b, 371a, 371b, 372a, 372b, 373a, 373b, 374a, 374b, 375a and 375b. Elements 301, 309, 310, 311, 312, 313, 314, 315, 316, 370a, 370b, 371a, 371b, 372a, 372b, 373a, 373b, 374a, 374b, 375a and 375b may be connected as shown in FIGS. 3A, 3B, and 3C.

The cage defining the driver torso cavity 3200 may comprise elements such as 303, 304, 351b, 351a, 358b, 358a, 367b, 367a, 359b, 359a, 360b, 360a, 361b, 361a, 362b, 362a, 363b, 363a, 364b, 364a, 365b and 365a, which may be connected together as shown in FIGS. 3A, 3B, and 3C. The lengths of elements 358a, 358b, 367a, 367b, 351a, 351b, 359a, 359b, 360a, 360b, 361a, 361b, 362a, 362b, 363a, 363b, 364a, 364b, 365a and 365b may be determined by the overall height of the recreational vehicle. The lengths of elements 303 and 304 may be determined by the overall width of the recreational vehicle. The shape and placement of elements 303, 304, 350a, 350b, 352a, 352b, 360a, 360b, 367a and 367b may be affected by considerations including, but not limited to, the size and shape of the front windshield, the rear windshield, the driver's left window, and the driver's right window, operable to provide a driver with an adequate field of view.

A door is formed in one side of the frame surrounding the driver torso cavity 3200. Referring to FIG. 3B, the door may comprise elements such as 359a, 360a, 361a, 362a, 363a, 364a, 365a, and 366a. Preferably the door is hinged along one side, for example between elements 358a and 359a. This allows the driver to ingress and egress the vehicle much like a typical automobile, rather than through the top of the vehicle as seen in go-carts and the like.

The cage defining the driver leg cavity 3100 may comprise elements such as 301, 302, 350a, 350b, 355a, 355b, 356a, 356b, 357a and 357b, which may be connected as shown in FIGS. 3A, 3B, and 3C. The lengths of elements 350a, 350b, 355a, 355b, 356a, 356b, 357a and 357b may be determined by the overall height of the vehicle, and similarly the length of element 302 may be determined by the overall width of the vehicle.

In an embodiment of the present invention, the cage defining the engine cavity 3300 may comprise elements 305, 306, 307, 308, 352a, 352b, 353a, 353b, 354a, 354b, 368a, 368b, 369a and 369b which may be connected as shown in FIGS. 3A, 3B, and 3C. The lengths of elements 352a, 352b, 353a, 353b, 354a, 354b, 368a, 368b, 369a and 369b may be determined by the height of a specific engine chosen for use with the vehicle. The lengths of elements 305, 306, 307 and 308 may be determined by the width of a specific engine. The lengths of elements 352a, 352b, 353a, 353b, 354a and 354b may be determined by the depth of a specific engine.

The cage defining the driver leg cavity 3100 and the cage defining the driver torso cavity 3200 may also be joined as shown in FIGS. 3A, 3B, and 3C. The cage defining the engine cavity and the cage defining the driver torso cavity may be joined as shown in FIGS. 3A, 3B, and 3C. In an embodiment, the cage defining the engine cavity and the cage defining the driver torso cavity may be joined by welding. The connections between the elements comprising the cage of the chassis frame 300 may be made by any means suitable to secure two elements together, such as pins, bolts, screws and the like. A particular means for securing connections between elements may depend upon factors such as, but not limited to, the material from which each element is made, whether an element is solid or tubular, and the expected use and top speed of the recreational vehicle. In an embodiment where the elements of the chassis frame 300 comprise tubular steel, individual elements may be securely connected by welding the elements together.

Figure 2:
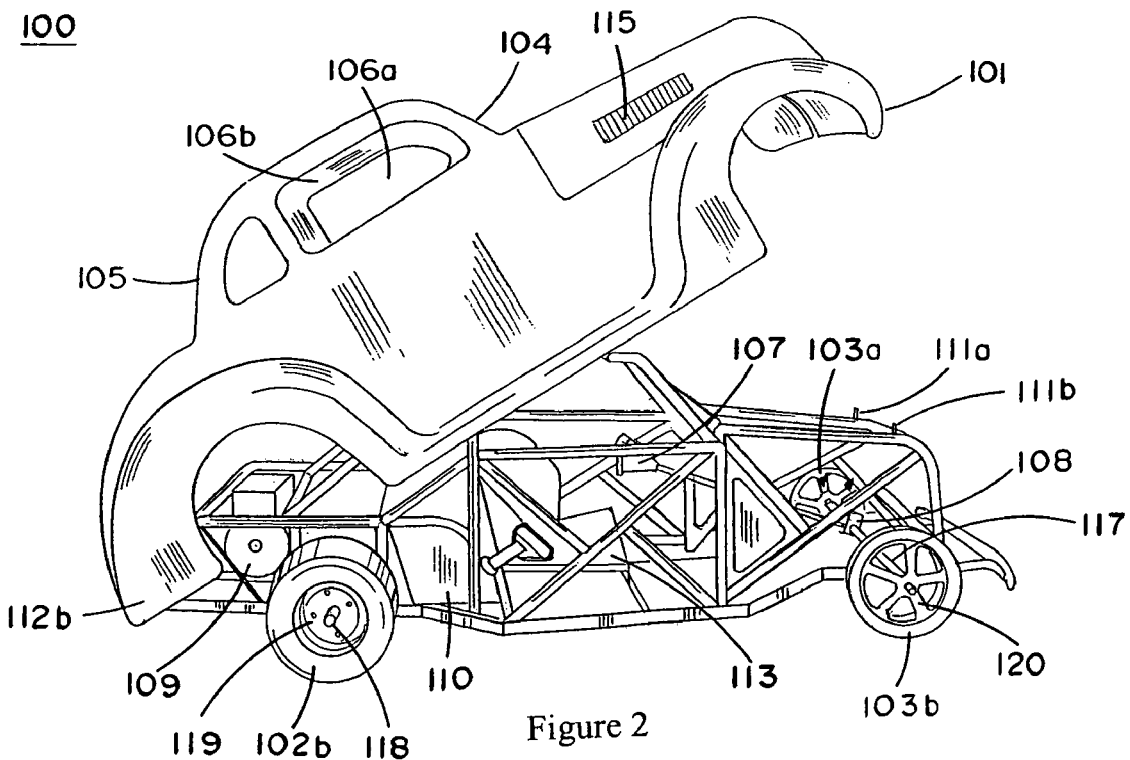
FIG. 2 is an illustration of an embodiment of the external body and chassis frame of the recreational vehicle of the present invention.

The recreational vehicle 100 may also comprise a plurality of axles 117, 118, a plurality of wheels 119a, 119b, 120a, 120b and a plurality of tires 102a, 102b, 103a, 103b. In an embodiment, a plurality of axles 117, 118 may be aligned substantially perpendicular to the vehicle's longitudinal axis as shown in FIGS. 1 and 2. In an embodiment, a plurality of wheels may be affixed to each axle as shown in FIGS. 1 and 2. In an embodiment, a plurality of tires may be affixed to the wheels as shown in FIGS. 1 and 2. The wheels and/or tires are selected based upon the predetermined characteristics of the vehicle and any regulations associated with a particular racing format.

Figure 4A:
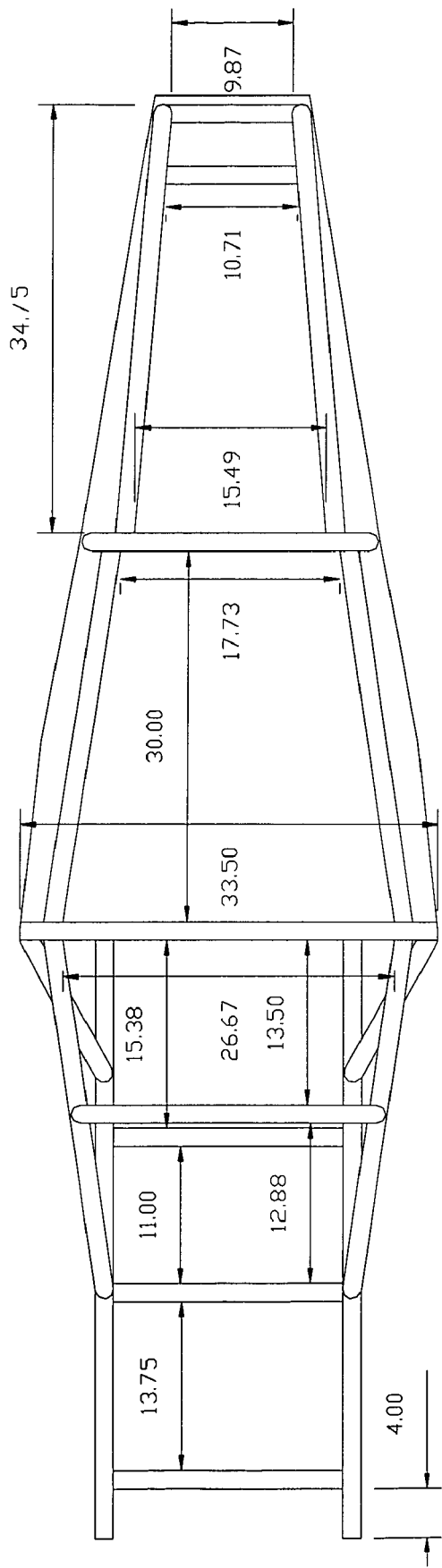
FIG. 4A is a top view of an embodiment of the chassis of the recreational vehicle of the present invention.
Figure 4B:
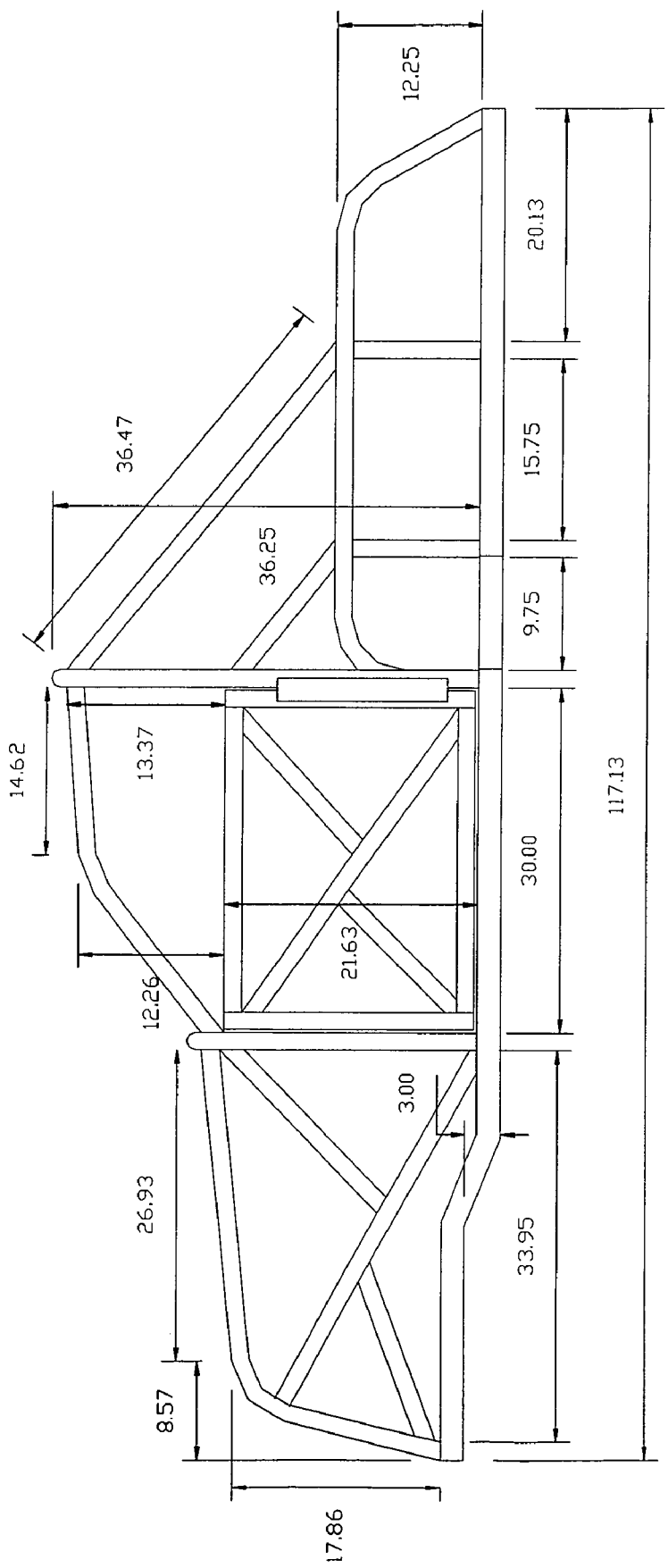
FIG. 4B is a bottom view of an embodiment of the chassis of the recreational vehicle of the present invention.
Figure 4C:
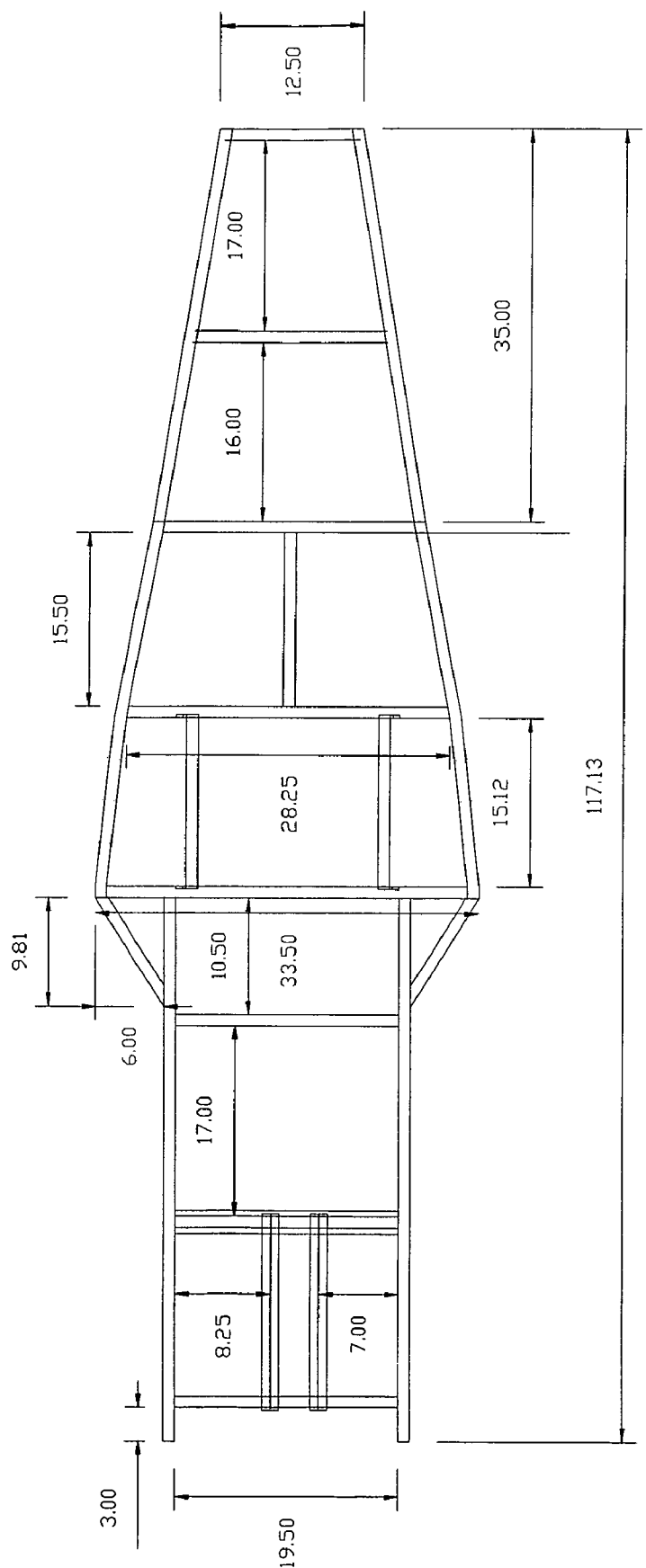
FIG. 4C is a bottom view of an embodiment of the chassis of the recreational vehicle of the present invention.

To illustrate the size and dimension of the an embodiment of the present invention, FIGS. 4A, 4B, and 4C illustrate one embodiment of the vehicle where the dimensions of the chassis are shown in inches. The dimensions of the drawings are herein incorporated by reference. One feature of an embodiment of the present invention is the incorporation of the components discussed below into a vehicle sized for adolescents and adults. In one embodiment of the present invention, the overall frame length is between 72 and 132 inches. In another embodiment of the present invention, illustrated in FIG. 4B the overall length of the frame is about 117 inches. In one embodiment of the present invention, the overall frame width is between 24 and 42 inches. In another embodiment of the present invention, illustrated in FIG. 4C the overall width of the frame is about 34 inches. In one embodiment of the present invention, the overall frame height is between 25 and 45 inches. In another embodiment of the present invention, illustrated in FIG. 4B the overall width of the frame is about 38 inches.

Referring now to FIGS. 1 and 2, the cage defining the driver cavity may enclose additional elements of the recreational vehicle including, but not limited to, a plurality of control pedals. a steering wheel 107, and a steering mechanism 108 comprising a plurality of steering elements. In an embodiment, a steering wheel 107 may be adjustable to allow drivers of varying sizes to operate the steering wheel 107. The steering mechanism preferably comprises a steering wheel connected through a rotatable rod to a bell drank which in turn is connected to a set of tie rods each terminating at a ball joint connecting each of the wheels. In an alternate embodiment of the present invention, the steering mechanics comprises a rack and pinion steering system. The steering wheel is connected through a tunable rod with a gear at the distal end. The gear engages a toothed rack which translates the rotational motion of the steering wheel into a lateral movement of the rack. The ends of the rack are functionally connected to the wheels, such as through a ball joint, to provide a steering movement. In alternate embodiments of the present invention, other steering mechanism known in the art, such as re-circulating ball steering elements, may be employed.

In an embodiment of the present invention, the acceleration and deceleration of the vehicle are controlled by the driver through gas and brake pedals. The pedals are mounted within the driver foot cavity 3100. Generally, the gas pedal is functionally connected to the engine through a cable which, in conjunction with springs, is pulled or pushed by depressing and releasing the gas pedal which in turn causes the throttle valve on the engine to open and close. The brake pedal similarly actuates a cable which is attached to a caliper. The action of the cable on the caliper causes it to close and engage a disk brake which is mounted on the rear axle. In this manner the speed of the vehicle may be controlled by an operator. In one embodiment of the present invention, the gas pedal is mounted proximate to the right side of the driver leg cavity and is operated with the driver's right foot. The brake pedal is mounted proximate to the left side of the driver leg cavity and is operated with the driver's left foot.

In one embodiment of the present invention, the gas and brake pedals are mounted on a horizontal beam which stretches across the foot cavity 3100 and retains both pedals and their associated components and secures them to the frame members 370a and 370b. This configuration allows for relatively simple repositioning of the pedals by detaching the entire beam with the pedals and moving it to a new location along the frame members 370a and 370b to suit the dimensions of a new driver.

A particular combination of steering wheel, steering mechanism, pedals, wheels, and tires may depend upon the intended use of the recreational vehicle. As discussed above, the steering wheel, steering mechanism, wheels, pedals, and tires may be changed to better accommodate an intended driving or racing condition.

In one embodiment of the present invention, the seat provided in the vehicle is a seat which is suitable to perform several functions, including keeping the driver inside the roll cage during sudden directional changes or rollovers, keeping the driver from contacting the frame, steering wheel, or any other hard surface during a crash, and must absorb some of the impact of a crash by bending or flexing.

Another important factor is the shape of the seat. A seat which provides lateral support by wrapping at least partially around a driver's rib cage will provide more support during a crash. The side members of the seat spread the force of the crash over a larger area of the driver's body instead of concentrating it along his back or spine. In an additional embodiment of the present invention, the seat comprises portions which wrap around the driver's shoulders as well. In a still further embodiment of the present invention, the seat is also provided with means for attaching the driver's helmet One embodiment of the present invention employs safety seats which are certified by NASCAR®. These NASCAR® certified seats provide all of the features discussed above and have gone through extensive crash testing to ensure the safety of the occupant. In addition to the seat, the seat belt is an importation safety feature available to car drivers.

Generally, the combination of seat belts and the seat transfer most of the driver's energy to the car during a crash. The restraint used on NASCAR® race cars is a five-point harness. Two straps come down over the driver's shoulders, two straps wrap around his waist and one comes up between his legs. The straps generally comprise thick, padded nylon webbing which is much stronger than the seatbelts in a street car. They are designed to hold the driver in more tightly such that the body decelerated with the vehicle rather than being bounced about the passenger compartment by a looser fitting and stretchable seatbelt. Limiting driver movement in the event of a crash through the use of highly engineered seats and seatbelts significantly increases the ability of a driver to avoid serious injury.

The cage defining the engine cavity 3300 encloses elements of the recreational vehicle 100 associated with the engine and drive train including, but not limited to, an engine 109, a firewall 110, the rear axle 118, and a transmission (not pictured). In an embodiment, the engine 109 may be a two-cycle engine. In another embodiment, the engine 109 may be a four-cycle engine. In an embodiment, the transmission may be a direct-drive transmission. In another embodiment, the transmission may comprise gear-reduction elements. As the vehicle of the present invention is designed with safety considerations in mind, embodiments of the present invention generally employ an engine comprising less than 50 horsepower. In a further embodiment of the present invention, the engine comprises less than 8 horsepower.

In one embodiment of the present invention, the engine is positioned rearward of the rear wheels. In this configuration, the rear wheels are between the rear of the driver seat and forward of the engine. This allows for better weight distribution of the engine and the driver, and also allows for greater separation between the driver and potentially dangerous engine components such as the exhaust and fuel tank.

In a further embodiment of the present invention, the rear wheels are connected to one another through a rear axle 118. The rear axle receives rotational force from the engine through a chain connected directly to a sprocket wheel mounted on the crankshaft. As the crankshaft rotates, the chain is pulled around the sprocket thereby rotating the axle through a second sprocket mounted thereon. This is the standard drive configuration for a one-speed vehicle for use in embodiments of the present invention.

In one embodiment of the present invention, a firewall 110 is provided to protect the driver cavity, and specifically the seat and the driver, from heat and possible shrapnel in the event of a massive engine failure or fire. The firewall comprises a fire-resistant and/or fire proof material placed between the engine and the rear of the driver's seat. In one embodiment of the present invention, the firewall 110 comprises aluminum sheet, about 0.030 inch thick. For example, referring to FIGS. 3A, 3B, and 3C a sheet of steel spanning the distance between the frame members 304, 367, and 313 would provide protection to the driver cavity. In another embodiment of the present invention, the firewall is fashioned to span the distance between frame member 304, 305, and 306. The exact placement of the fire wall can vary depending upon the final frame construction, as long as it is positioned in an area between the rear of the driver seat and the engine and fuel tank.

In one embodiment of the present invention, an exterior body is mounted to the frame so as to provide the realistic appearance of a stylized vehicle. The exterior body is mounted for easy installation and removal to facilitate access to the frame and/or to change the exterior body style. Referring again to FIGS. 1 and 2, the external body 101 of the recreational vehicle 100 may comprise a shaped, rigid or semi-rigid material such as fiberglass and sheet metal, a front windshield 104, a rear windshield 105, a plurality of side windows 106a, 106b and an escape hatch 123 affixed to the roof of the external body 101 of the recreational vehicle 100. The external body 101 of the recreational vehicle 100 may also comprise a plurality of mounting points 111a, 111b, 112a, 112b for affixing the external body 101 to the chassis frame 300. The mounting points may be screws, clips, hooks, tongue and groove slides, or other known means of releaseably securing large parts.

Figure 5:
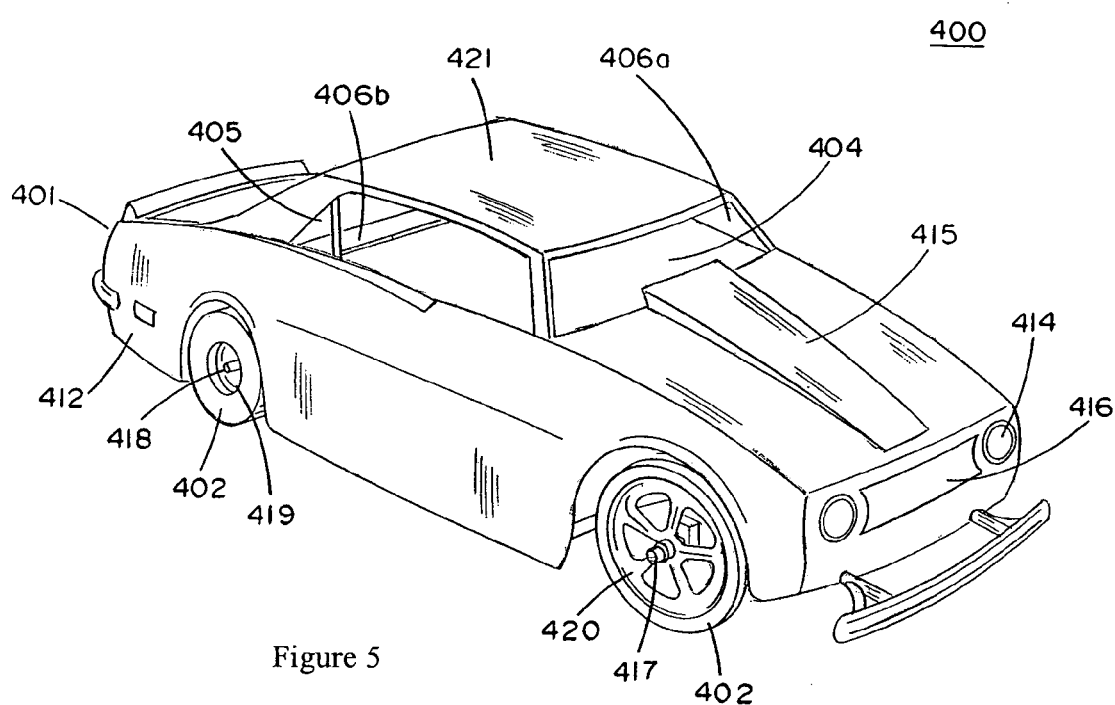
FIG. 5 is an illustration of an embodiment of a recreational vehicle of the present invention comprising the frame and components of the vehicle of FIG. 1 with a differently styled exterior body mounted thereon.
Figure 6:
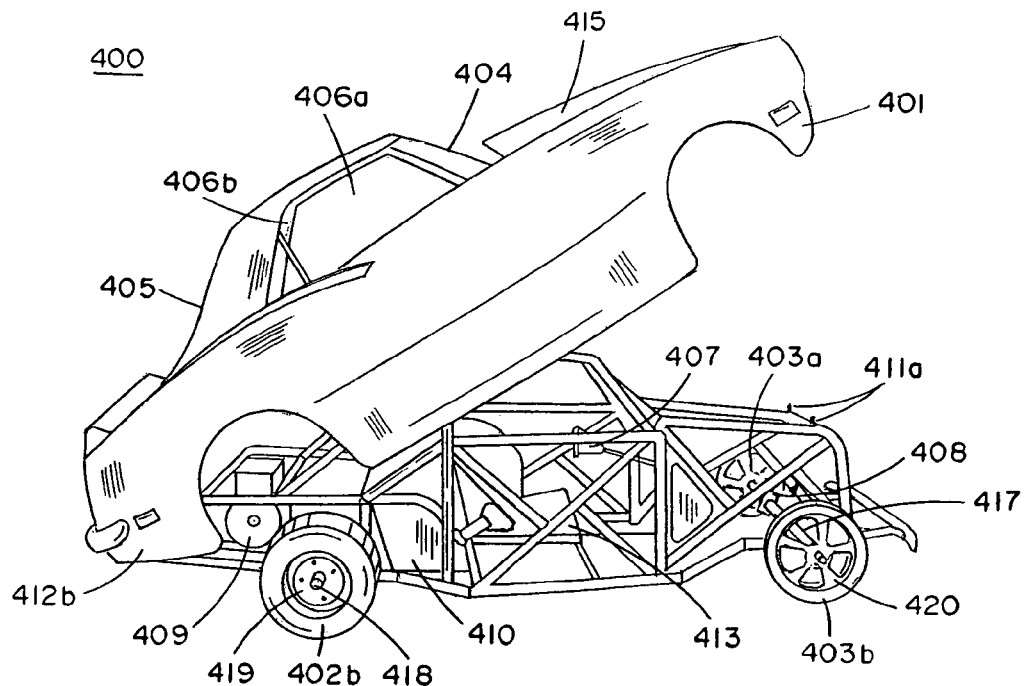
FIG. 6 is an illustration of an embodiment of the external body and chassis frame of the recreational vehicle of the present invention comprising the frame and components of the vehicle of FIG. 1 with a differently styled exterior body mounted thereon.

In another embodiment of the present invention, the exterior body is removable and replaceable with an exterior body comprising a different stylized appearance. To illustrate this, FIGS. 5 and 6 are provided to contrast FIGS. 1 and 2. In FIGS. 1 and 2 a recreational vehicle 100 is shown comprising an exterior body in the form of a late 1930s Chevrolet® coupe 101 mounted to a frame. The vehicle 100 comprises components mounted to the frame such as a steering wheel 107, axles 117, 118 with wheels 119, 120 and tires 102, 103, an engine 109, a seat 113, and a firewall 110 between the engine and the seat. The vehicle 100 also comprises components which are associated with the exterior body 101 such as windows 104, 105, 106, a front grille 116, lights 114, and other styling 115.

FIGS. 5 and 6 illustrate a vehicle 400 comprising components mounted to a frame which are identical to the components of the previous vehicle 100, such as a steering wheel 407, axles 417, 418 with wheels 419, 420 and tires 402, 403, an engine 409, a seat 413, and a firewall 410 between the engine and the seat. Thus, the same frame is used in both vehicle designs. The exterior body 401 of the second vehicle 400 comprises a considerably different appearance such as a Chevrolet Camero®. The Camero® 400 comprises features which may be identical in theme, but are quite different in stylized form, such as the windows 404, 405, 406, the front grille 416, the rear end 412 and the headlights 414. In this manner, the exterior appearance of the vehicle is changeable by mounting a different stylized body to the preexisting frame.

In one embodiment of the present invention, the exterior body is hingedly attached to the frame through hooks, clips, or the like in the rear of the vehicle. A driver can enter or exit the vehicle by raising the body off the frame in the front of the vehicle and pivoting the body on the hinged attachment points in the rear. In this manner the exterior body is opened as is shown in FIGS. 2 and 6. When the exterior body is open such that the door on the frame is clear to open, the door is swung open to provide access to the driver cavity of the vehicle. In another embodiment of the present invention, shocks or pistons are provided to hold the exterior in the open position and to prevent the body from rapidly closing on a driver or the vehicle.

The external body 101 may also comprise a plurality of headlights 114, a plurality of tail-lights (not pictured), a plurality of openings 115, 116 to transude ambient air to the interior of the recreational vehicle 100. In an embodiment, the chassis frame 300 may affect the size and shape of the external body 101 of the recreational vehicle 100. In an embodiment of the present invention, the size and shape of the frame 300 allows various different external bodies to be easily placed onto the chassis 300. For example, external bodies with profiles similar to a Chevrolet Camaro®, a Ford Mustang®, or a Pontiac Trans Am® may be installed onto the chassis frame 300. FIGS. 5 and 6 illustrate the frame displayed in FIGS. 1 and 2 with a different exterior body affixed thereto. As can be seen, the body style of FIGS. 1 and 2 appears to be quite different than that of FIGS. 5 and 6; however, the same frame and same internal components are employed in both examples.

This feature allows a "universal" frame and components to be used with a variety of different external body styles. The design of the frame and various components of the vehicle within and mounted to the frame allows for the exterior body to be interchangeable. The same frame and components may be used with a variety of external body designs to give the impression to an observer of different "classic" vehicle stylings or a unique styling. In this manner, a driver does not have to adjust to a new vehicle or controls in order to appear to be driving a differently designed vehicle. All that is necessary is a changing of the exterior shell on the standard frame.

In a further embodiment of the present invention an escape hatch 121 is provided as an additional safety feature. The vehicle frame is constructed in such a manner so as to completely enclose the driver; however, the top of the frame in the driver body cavity 3200 provides sufficient room for a driver to slide between the various frame members. As shown in FIG. 3A and the corresponding example in FIG. 4A, the distance between frame members 303, 304, 351*a*, and 351*b* provides an area therebetween while allowing for the requisite strength and protection during a crash. To accompany the area between the top-most frame members in the driver cavity, the exterior body is constructed with an escape hatch. The hatch 121 comprises a portion of the roof of the exterior body which can be easily removed or opened in the event of an emergency. Should the vehicle operator require an alternate means of escape rather than through the side door 360*a*-366*a*, the escape hatch 121 will provide rapid exit from the vehicle.

In another embodiment of the present invention, a fire extinguisher is provide as a further safety feature. The fire extinguisher is mounted within the driver cavity such that a vehicle operator may activate the fire extinguisher in the event of a fire. In one embodiment of the present invention, the fire extinguisher comprises a fire suppression system such as the Firebottle® system manufactured by Saftey Systemsc Inc. This system comprises a fire suppression system which may be manually or automatically operated. The system comprises a canister of fire retardant chemical such as Halon 1211 or DuPont FE-36, along with distribution tubing to carry the chemical to various points within the vehicle.

Although the present invention has been described with reference to particular embodiments, it should be recognized that these embodiments are merely illustrative of the principles of the present invention. Those of ordinary skill in the art will appreciate that the apparatus and methods of the present invention may be constructed and implemented in other ways and embodiments. Accordingly, the description herein should not be read as limiting the present invention, as other embodiments also fall within the scope of the present invention.

What is claimed is:

1. A recreational vehicle comprising:
a) a frame comprising a driver cavity and an engine cavity formed of a rigid material dimensioned so as to be capable of containing a driver therein such that no portion of the driver's body extends outside the frame during operation of the vehicle;
b) a pair of steerable front wheels and a pair of rear wheels;
c) a steering mechanism functionally engaged to the front wheels;
d) a seat positioned forward of the rear wheels and affixed to the frame;
e) an engine positioned rearward of the rear wheels;
f) a gas pedal positioned proximate to a first side of the driver cavity and functionally engaged to the engine;
g) a brake pedal positioned proximate to a second side of the driver cavity and functionally engaged to at least one of the wheels; and,
h) an exterior body affixed to the frame;
wherein the frame further comprises a door formed in one side thereof that can open and close to allow ingress and egress to the vehicle.

2. The vehicle of claim 1, wherein the overall length of the frame is between about 72 inches and about 132 inches.

3. The vehicle of claim 1, wherein the overall width of the frame is between about 24 inches and about 42 inches.

4. The vehicle of claim 1, wherein the overall height of the frame is between about 25 inches and about 45 inches.

5. The vehicle of claim 1, wherein the seat comprises side portions which at least partially wrap around a driver's ribcage.

6. The vehicle of claim 1, further comprising a seat belt comprising a five-point harness.

7. The vehicle of claim 1, wherein the seat comprises a safety seat.

8. The vehicle of claim 1, wherein a firewall is positioned between the seat and the engine and comprises a fire-resistant material.

9. The vehicle of claim 1, wherein the pair of rear wheels are connected through a common axle to which the engine is functionally engaged so as to provide torque to both wheels through the axle.

10. The vehicle of claim 1, wherein the engine comprises a two-stroke internal combustion engine.

11. The vehicle of claim 1, wherein the engine comprises an output of less than 50 horsepower.

12. The vehicle of claim 1, comprising a safety feature comprising at least one of the following: a safety seat, a firewall between the engine cavity and the driver cavity, a fire extinguisher, and an overhead escape hatch in the driver cavity.

13. The vehicle of claim 1, wherein the exterior body comprises a one-piece shell.

14. The vehicle of claim 4, wherein the overall height of the frame is about 36 inches.

15. A recreational vehicle comprising:
a) a frame comprising a driver cavity and an engine cavity formed of a rigid material dimensioned so as to be capable of containing a driver therein such that no portion of the driver's body extends outside the frame during operation of the vehicle;
b) a pair of steerable front wheels and a pair of rear wheels;
c) a steering mechanism functionally engaged to the front wheels;
d) a seat positioned;
e) an engine;
f) a gas pedal positioned proximate to a first side of the driver cavity and functionally engaged to the engine;
g) a brake pedal positioned proximate to a second side of the driver cavity and functionally engaged to at least one of the wheels; and,
h) an exterior body affixed to the frame;
wherein the exterior body is hingedly affixed to the frame in the rear of the vehicle such that the exterior body may be detached from the frame in the front of the vehicle and opened while remaining attached to the frame in the rear of the vehicle; a door formed in one side thereof that can open and close to allow ingress and egress to the vehicle; and
wherein said exterior body comprises a first stylized appearance and may be completely removed from the vehicle and replaced with a different exterior body having a second stylized appearance, wherein said second stylized appearance is of a different type of vehicle than the first stylized appearance.

16. The vehicle of claim 15, wherein the seat comprises side portions which at least partially wrap around a driver's ribcage.

17. The vehicle of claim 15, further comprising a seat belt comprising a five-point harness.

18. The vehicle of claim 15, wherein the engine comprises a two-stroke internal combustion engine.

19. The vehicle of claim 15, comprising a safety feature comprising at least one of the following: a safety seat, a firewall between the engine cavity and the driver cavity, a fire extinguisher, and an overhead escape hatch in the driver cavity.

20. The vehicle of claim 15, wherein the exterior body comprises a one-piece shell.

\* \* \* \* \*